(12) United States Patent
Garcia Morchon et al.

(10) Patent No.: US 8,495,373 B2
(45) Date of Patent: Jul. 23, 2013

(54) METHOD OF GENERATING A CRYPTOGRAPHIC KEY, NETWORK AND COMPUTER PROGRAM THEREFOR

(75) Inventors: Oscar Garcia Morchon, Eindhoven (NL); Bozena Erdmann, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 118 days.

(21) Appl. No.: 13/124,721

(22) PCT Filed: Oct. 8, 2009

(86) PCT No.: PCT/IB2009/054415
§ 371 (c)(1),
(2), (4) Date: Apr. 18, 2011

(87) PCT Pub. No.: WO2010/046799
PCT Pub. Date: Apr. 29, 2010

(65) Prior Publication Data
US 2011/0206201 A1    Aug. 25, 2011

(30) Foreign Application Priority Data
Oct. 20, 2008    (EP) .................................... 08305705

(51) Int. Cl.
*H04L 9/30*    (2006.01)
(52) U.S. Cl.
USPC ............................... 713/171; 380/30; 380/44

(58) Field of Classification Search
None
See application file for complete search history.

(56) References Cited

U.S. PATENT DOCUMENTS

| 2002/0041682 A1* | 4/2002 | Lambert | 380/28 |
| 2002/0196945 A1 | 12/2002 | Umeno | |
| 2008/0069344 A1* | 3/2008 | Yao et al. | 380/44 |

FOREIGN PATENT DOCUMENTS
WO    WO2007149850 A2    12/2007

* cited by examiner

*Primary Examiner* — Gilberto Barron, Jr.
*Assistant Examiner* — Simon Kanaan
(74) *Attorney, Agent, or Firm* — Larry Liberchuk

(57) ABSTRACT

The present invention relates to security systems for communication networks. More precisely, the invention relates to a method for generating a shared key between a first node (D1) and a second node (D2) for secure communication in a network (1), the first node storing a first node keying material share based on a root keying material and the method comprising the following steps: a) the first node receiving an identifier of the second node, b) the first node evaluating the first node keying material share at a second node's identifier, to generate the shared key, wherein the first node keying material share is a polynomial-based keying material over a finite field $F_q$ and step b) comprises: b1) the first node applying a Horner's rule to factorize the first node keying material under the form of a combination of monomials, b2) the first node computing the result of each monomial operation by evaluating at a predetermined point a polynomial of degree $r-1$ with coefficients in a sub-field of $F_q$. The invention also relates to a network and a computer program thereof.

11 Claims, 2 Drawing Sheets

METHOD OF GENERATING A CRYPTOGRAPHIC KEY, NETWORK AND COMPUTER PROGRAM THEREFOR

FIELD OF THE INVENTION

The present invention relates to security systems for communication networks.

More precisely, the invention relates to a method for generating cryptographic key for securing communication between different nodes in a network.

This invention is, for example, relevant for wireless networks such as medical actuator and sensor networks or home appliances networks.

BACKGROUND OF THE INVENTION

Some conventional secure systems for networks of the like are based on keying material share distribution schemes called alpha-secure, in which a node belonging to a network is not directly provided with cryptographic ready-made key, but with some node-specific keying material allowing it to compute a shared key with another node of the network, for securing communication. This node-specific information is a keying material share derived from a root keying material comprised in a management device of the network. The root keying material is such that the capture of less than alpha nodes, and thus the combination of less than alpha keying-material shares, does not reveal anything about the root keying material. Consequently, such systems offer a good resiliency under attack, when alpha is chosen great enough. Further uncorrelation techniques can be used to further increase the system security by uncorrelating the keying material shares distributed to the nodes, and thus preventing attackers from gaining knowledge about the underlying root keying material, without interfering in the key generation process.

Alpha-secure systems enable different security functionalities including key distribution, broadcasting information and cryptographically linking information to the keying material shares carried by an entity by means of lightweight digital certificates.

The root keying material is, for example, a symmetric bivariate polynomial of degree alpha, and the keying material share of a node is obtained by evaluating this bivariate polynomial at a point corresponding to an identifier of this node.

Generally, polynomials over large finite fields are used, which means that their coefficients are included in large prime finite fields, thus requiring high requirements for performing computation. However, the devices included in wireless sensors networks or other networks of the like are generally resource-constrained in terms of computational and communication resources. Accordingly, conventional methods are not well adapted to such networks.

Alternative solutions carrying out key segmentation have also been proposed. These solutions lie on the use of several sub-polynomials concatenated to form a polynomial representing a keying material. However, this segmentation, even if reducing the number of computing operations, does not help solving the issue of resource-requirements namely in terms of memory size.

The use of alpha-secure system for the generation polynomial-based certificates introduces further challenges in their efficient implementation. Identity segmentation techniques can be applied; however, there exists an important trade-off between two possible configurations. The first one is based on the use of a high number of short segments. The second one uses a few large segments. While the first one requires higher memory requirements, the second one requires higher computational requirements due to the longer segment size.

SUMMARY OF THE INVENTION

It is an object of the invention to provide a secure system overcoming the drawbacks above-mentioned.

It is another object of the invention to provide a method for efficient generation of a cryptographic key in a communication network.

Still another object of the invention is to provide a method for generating a cryptographic key while minimizing both memory and computational requirements in alpha-secure systems used for key agreement and polynomial-based certificates.

Still another object of the invention is to provide a method for generating a cryptographic key with increase resiliency under attack in, e.g., polynomial-based certificate schemes.

To this end, the invention provides a method for generating a shared key between a first node and a second node for secure communication in a network, the first node storing a first node keying material share based on a root keying material.

The method comprises the following steps:

A step a) consisting in the first node receiving an identifier of the second node;

A step b) consisting in the first node evaluating the first node keying material share at a second node's identifier, to generate the shared key, wherein the first node keying material share is a polynomial-based keying material over a finite field $F_q$, In accordance with the current definition of the invention, the evaluating step comprises:

A sub-step b1) of the first node factorizing the first node keying material under the form of a reduced polynomial over the field $F_q$ modulo an irreducible polynomial of degree r with coefficients in a sub-field of $F_q$, the reduced polynomial being arranged so that evaluating the first node keying material at the second node's identifier includes iteratively evaluating and combining pairs of polynomials, for example monomials, at the second node's identifier over the field $F_q$, modulo the irreducible polynomial, b2) the first node computing the result of each monomial operation by evaluating at a predetermined point a polynomial of degree r−1 with coefficients in a sub-field of $F_q$ modulo the irreducible polynomial of degree r in a sub-field of $F_q$, the coefficient polynomial being arranged so that evaluating the coefficient polynomial corresponds to iteratively evaluating and combining polynomials, for example monomials, at the predetermined point over the sub-field of $F_q$ modulo the irreducible polynomial.

As a consequence, the evaluation of the first node alpha-secure keying material is not performed over the finite field $F_q$, as in the existing methods, but over a sub-field. Such a feature allows reducing the computing requirements for performing the method, namely when it comes to performing modular multiplications and additions.

In an exemplary embodiment, the first node keying material is based on a polynomial of degree alpha, alpha being for example equal to r−1, as well as the reduced polynomial having coefficients in a sub-field of $F_q$.

According to an additional embodiment, the system allows for key generation after system configuration so that a key is computed as the concatenation of t sub-key segments. Each sub-key segment is generated from the keying material of a different keying material segment of degree alpha.

Moreover, in an exemplary embodiment, the integer q defining the finite field is equal to $p^r$ where p is a prime number and r−1 is the degree of the monomials of the first node's keying material when interpreted as polynomials. In such an embodiment, the operations are performed in $Z_p[x]/f(x)$, corresponding to the set of polynomials of degree r−1 with coefficients in $Z_p$ module f(x), i.e. the set of integers modulo p. Such a field is quite small, thus the efficiency of the computation is highly increased, and the number of bits necessary for storing cryptographic elements is limited to r log (p).

In another exemplary embodiment, key segmentation is used, which means that the root keying material and the first node keying material share comprise several keying material segments. Thus, sub-step b) of the method is, in this embodiment, performed for each keying material share segment to generate key segments, and the method further comprises the step of combining the key segments to generate the eventual shared key.

Such an embodiment allows generating longer key without requiring too many additional resources. Indeed, only by concatenation of several key segments, which is not a highly complex operation, it is possible to obtain a longer shared key with minimal computation, and thus to increase again the resiliency of the system.

In still another exemplary embodiment, the method is implemented in a network comprising a management device comprising the root keying material, for example a trust center calculating and storing in a secure way the root keying material. The first node keying material share is thus generated by the management device, based on the root keying material and on an identifier of the first node, and transmitted to the first node. The management device is, for example, a trust center highly secured, which has the advantage of offering a good protection to the root keying materials.

The present invention also relates to a communication network comprising two communicating entities representing a first node and a second node of the network.

The first node comprises a memory for storing a first node keying material share, and means for evaluating the first node keying material share at a second node's identifier, to generate a shared key.

Evaluating means comprise at least some of the following means:
Means for calculating t key segments, for example consecutively,
Means for generating a key segment from each keying material segment, comprising by factorizing the first node keying material, i.e. factorizing each monomial of first node's keying material segment under the form of a reduced polynomial, for example of degree r−1 over a sub-field of $F_q$. The evaluation of the first node keying material at the second node's identifier corresponds to iteratively evaluating and combining monomials interpreted as polynomials of degree r−1 whose coefficients are over a sub-field of $F_q$, modulo an irreducible polynomial of degree r with elements in the sub-field of Fq, and
means for computing the result of each monomial operation by evaluating in a predetermined point a coefficient polynomial of degree r−1 over the field $F_q$ modulo the irreducible polynomial of degree r−1 over the sub-field of $F_q$, the coefficient polynomial being arranged so that evaluating the coefficient polynomial corresponds to iteratively evaluating and combining monomials over the sub-field of $F_q$ modulo the irreducible polynomial.

In the present description, a monomial comprises one coefficient of degree 1, and one coefficient of degree 0.

The invention also relates to a computer program for implementing a method according to the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

The present invention relates to a method for generating a shared key between two nodes for secure communication.

Figure 1:
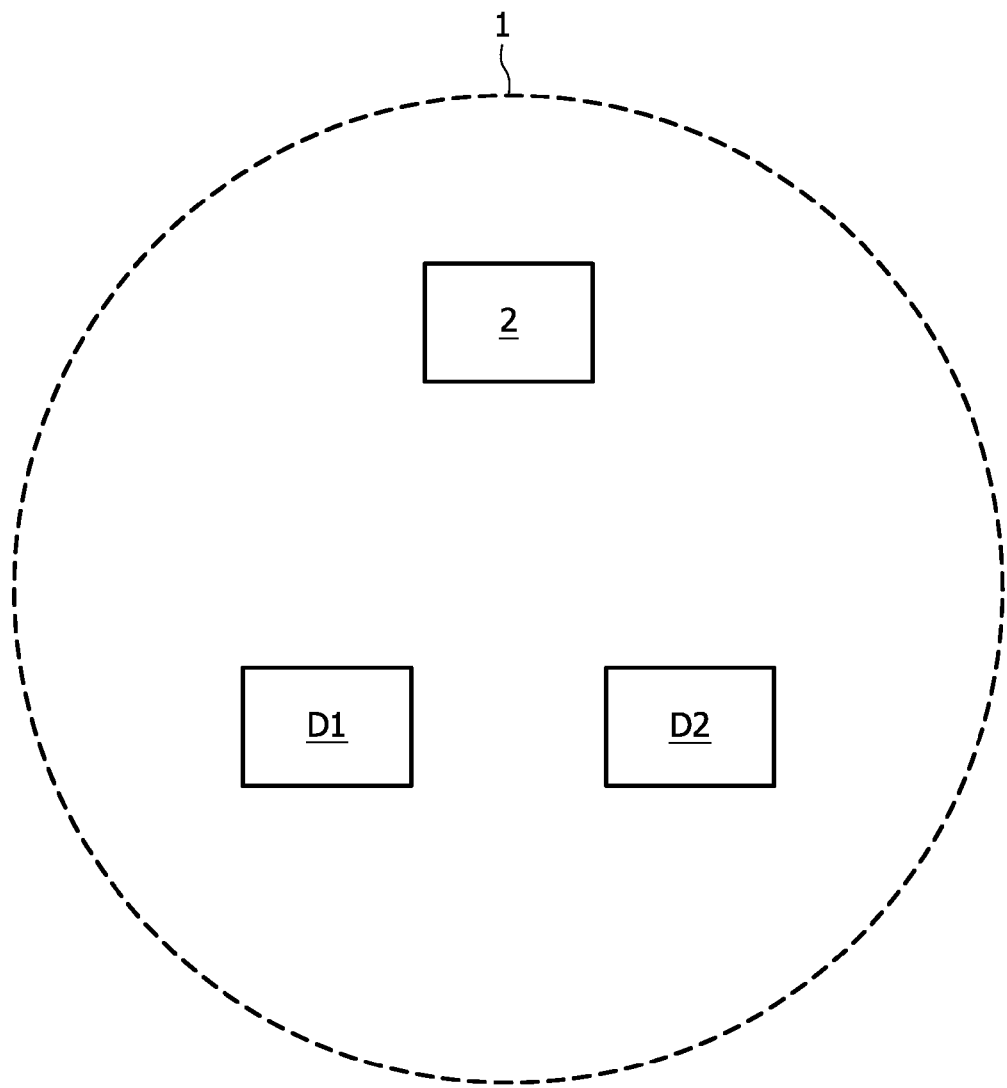
FIG. 1 is an example of a network in which a first embodiment of the invention is implemented.

FIG. 1 shows a network 1 in which a first embodiment of a method according to the invention is implemented.

This network 1 comprises two communicating entities D1 and D2, representing nodes of the network, and further comprises a management device 2.

Examples of such a network 1 are as follows:
a wireless medical network, wherein the entities D1 and D2 are medical devices such as medical sensors and medical actuators,
a home appliances network, wherein the entities D1 and D2 are appliances such as a TV, a DVD player, an audio system,
a lighting network, wherein the entities D1 and D2 are lighting equipments in a building,
an electronic network, wherein D1 and D2 are electronic devices such as a personal digital assistant, a mobile phone, a computer, electronic car equipment.

The management device 2 is, in one embodiment, a trust center. In another embodiment, the network is a personal area network, belonging to a user. In this case, D1, D2 and the management device 2 belong to the user. The management device is, for example, a mobile phone or a digital assistant, comprising means for generating cryptographic material, for example a SIM card, and means for transmitting cryptographic material to D1 and D2.

In view of the examples previously given, it appears that networks addressed in the present invention may deal with sensitive data, thus requiring a high level of security when those data are exchanged between devices of a network. On another hand, devices such as body sensors are highly resource-constrained. The present invention thus provides a method for generating a shared key for devices D1 and D2 to exchange data securely or for generating authentication polynomial-based certificates, taking into account the limited amount of available resources in these devices.

The management device, in charge of the configuration of the network, stores the root keying material. In the present embodiment, the method is used together with an alpha-secure system, thus the root keying material is a multivariate polynomial over a finite field $F_q$, which means that all the coefficients of the multivariate polynomial belong to this field. In the present embodiment, q is equal to $p^r$, where p is a prime number and r is an integer strictly greater than 1. Thus the coefficients and identifiers of the multivariate polynomial can be interpreted as polynomials of degree r−1 with elements in $F_p$. Using $q=p^r$ allows for fine parameter configuration since it is possible to easily achieve different segment sizes by varying r and adapting the system to different architectures by choosing different p values.

$F_q$ is a finite field of order $q=p^r$, corresponding to the number of elements, and of characteristic p. There is a unique field of order $p^r$, and it contains a copy of $Z_p$, i.e. the set of all integers between 0 and p−1. $Z_p$ can thus be viewed as a sub-field of $F_q$. Finite fields are such that two elements belonging to $F_q$ can be added or multiplied modulo q.

The number of keys than can be generated based on the root keying material depends on the value of q. Particular values of q that can be used in the present method are, for example, $2^8$, $2^{16}$, $2^{32}$, $2^{64}$, $2^{128}$, $(2^8+1)^4$ and $(2^{16}+1)^2$. More generally, particular relevant values for q are $q=2^r$, where r is an integer, as the management device can easily configure segments of length r bits by choosing a different field size and the key generation algorithm only needs small modifications depending on the r parameter.

During the phase of network configuration, each device is provided with a keying material share, generated by the management device, based on the root material and on a crypto identifier of the device. In the case where the root keying material is a multivariate polynomial, e.g., a bivariate polynomial, generation of the keying material share for a specific device corresponds to evaluating this polynomial at the identifier of the device, to obtain a monovariate polynomial, stored in the device. Once a device is configured, it is then deployed in the network. When devices D1 and D2 want to communicate, they agree on a common shared key by each device evaluating its own keying material share at the other device's identifier.

Figure 2:
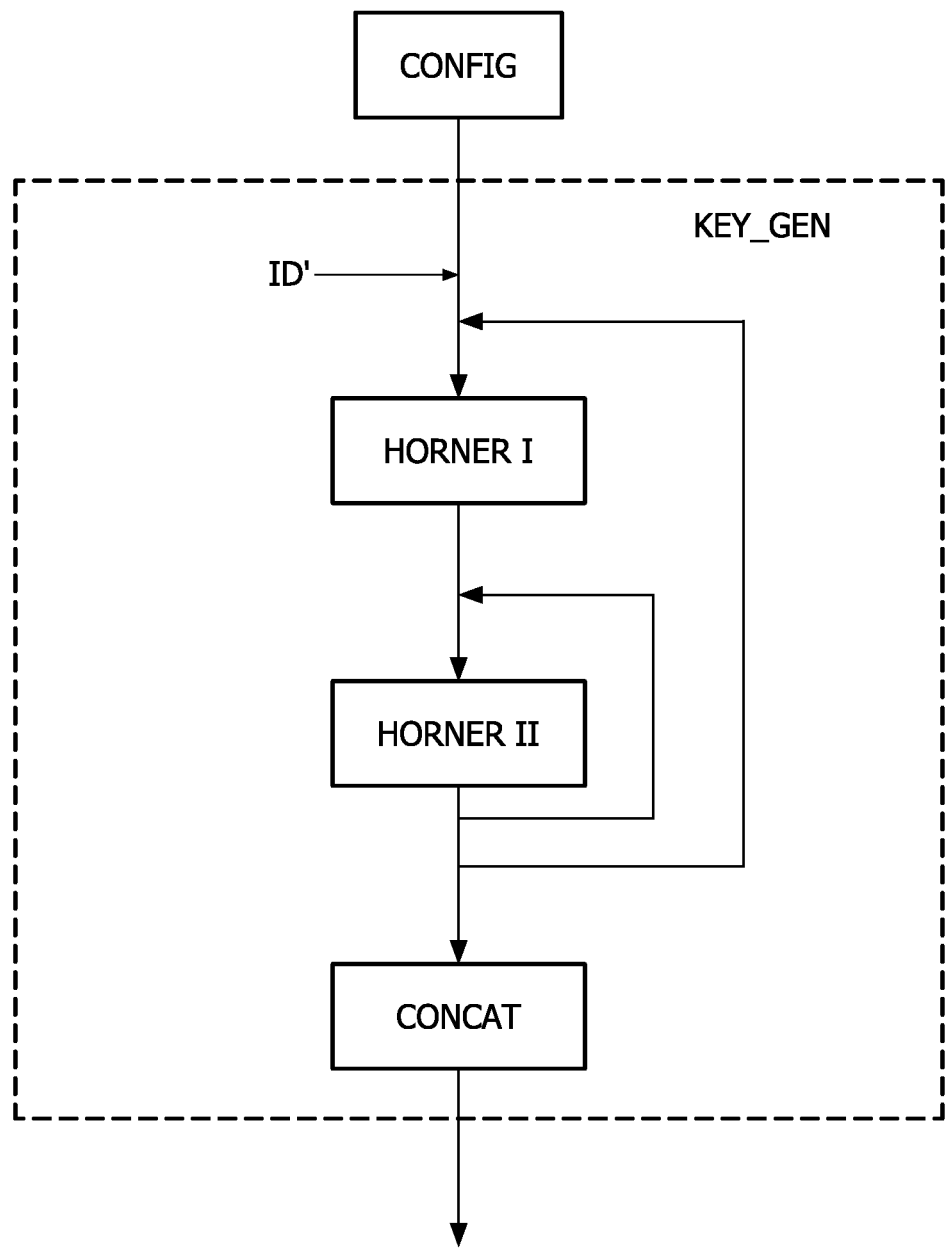
FIG. 2 is a block diagram showing an operating sequence of a second embodiment of a method according to the invention.

This process of generating a shared key will now be detailed on an example, with reference to a block diagram shown on FIG. 2.

The particular parameters chosen in this example are as follows:
$q=2^{32}$, and
four key segments are used, which means that the root keying material corresponds to a concatenation of four keying material segments, each of them being a bivariate polynomial.

Where the parameters p=2, r=32 and 4 segments of equal length are generated to optimize memory and computational requirements in a given network.

At the beginning, the management device comprises a root keying material $G(y,z)=g_1(y,z)\|g_2(y,z)\|g_3(y,z)\|g_4(y,z)$ where $$g_k(y,z) = \sum_{i,j=0}^{\lambda} a_{k-ij} y^i z^j (\mathrm{mod} f(x))$$

and $a_{ij}=a_{ji} \forall \{i,j\}$. Accordingly, each segment of the root keying material is symmetric, which allows generation on a shared key between two devices.

During the configuration phase CONFIG, a device having an identifier ID is provided with a keying material share G(ID,z) generated by the management device as follows:

$G(ID,z)=g_1(y=ID,z)\|g_2(y=ID,z)\|$
$\quad g_3(y=ID,z)\|g_4(y=ID,z)$.

When the device needs to communicate with another device having an identifier ID', it is necessary to generate a shared key by computing, in KEY_GEN, the value of $G(ID,z=ID')=g_1(ID,z=ID')\|g_2(ID,z=ID')\|$
$\quad g_3(ID,z=ID')\|g_4(ID,z=ID')$ Each segment is evaluated separately, and all segments are then concatenated at the end of the process, to obtain the eventual shared key.

Since $g_k$ is a polynomial over a finite field $F_q$ where $q=p^r=2^{32}$, it means that its monomials can be expressed as polynomials of degree 31 with coefficients in $Z_p$ modulo a polynomial f(x), where f(x) is an irreducible polynomial of degree r=32 over the sub-field $Z_p$ of $F_q$, as follows:

$$g_{k-ID}(z) = g_k(y=ID,z) = \sum_{i,j=0}^{\lambda=31} (a_{k-ij}(y=ID)^i) z^j (\mathrm{mod} f(x)) =$$

$$\sum_{j=0}^{\lambda=31} \left( \sum_{i=0}^{\lambda=31} a_{k-ij}(y=ID)^i \right) z^j (\mathrm{mod} f(x)) =$$

$$\sum_{j=0}^{\lambda=31} b_j z^j (\mathrm{mod} f(x)) = b_{31} z^{31} + \ldots + b_j z^w + \ldots + b_1 z^1 + b_0 (\mathrm{mod} f(x)).$$

In the above example λ takes the exemplary value of 31 but it might take any other value. If the system's management device chooses another set of configuration parameters, this representation can be easily adapted to, e.g., the new r value.

A possible value of f(x) in the case where $q=2^{32}$ is, for example $x^{32}+x^7+x^3+x^2+1$. More generally, f(x) is preferably chosen having only non-zero low degree coefficients to allow for a more efficient implementation.

Evaluation of such a polynomial require long computation times, thus a factorization method is used to speed up such evaluation. A known factorisation method for polynomials is the Horner's rule, which consists in expressing a polynomial as a combination of monomial forms. In the present embodiment, this Horner's rule is applied. However, the invention is not limited to this method, and may be implemented with any other methods of polynomials factorization.

Thus, in HORNER I step of the block diagram shown on FIG. 2, a Horner's rule is applied to $g_{k-ID}(z)$ to factorize it, so as to obtain a combination of monomials. Evaluation of monomials is less complex, and thus costless in terms of resources, than the evaluation of the expanded polynomial. This factorization can be written as follows, where the lambda value is equal to 31 here but might take any other value:

$g_{k-ID}(z) =$ $$\sum_{j=0}^{\lambda=31} b_j z^j (\mathrm{mod} f(x)) = b_{31} z^{31} + \ldots + b_j z^w + \ldots + b_1 z^1 + b_0 (\mathrm{mod} f(x)) =$$

$$(((b_{31} z + b_{30}) z + b_{29}) z \ldots + b_1) z + b_0 (\mathrm{mod} f(x))$$

In terms of computer algorithm, the HORNER I step can be expressed as:

```
r=b_lambda
for (ctr=lambda−1;ctr>0;ctr−−){
    r=r*ID'(mod (f(x));
    r=r + b_ctr
}
return r;
```

As described above, $g_{k-ID}$ is a polynomial over $F_{p^r}=F_{2^{32}}$, which means that all the coefficients h belong to this finite field. Each element in $F_{2^{32}}$ can be represented in a polynomial basis as an element C[x], where C[x] belongs to $Z_p[x]/f(x)$ which represents the set of all polynomials having coefficient in $Z_p=Z_2$, modulo f(x).

$$C[x]=c_{31}x^{31}+c_{30}x^{30}+\ldots+c_wx^w+\ldots+c_2x^2+c_1x+c_0==[c_{31}c_{30}\ldots c_w\ldots c_2c_1c_0].$$

Thus, to speed up again the evaluation of the main polynomial share, this embodiment of the invention is such that a second factorization process is applied to HORNER I, to each coefficient h. Thus, in step HORNER II, each coefficient $b_i$ of the keying material share segments to evaluate is expressed as an element in $Z_2[x]/f(x)$.

Thus, a general algorithm including both steps HORNER I and HORNER II can be expressed as:

```
CalculateKey([b_lambda,b_lambda-1,...,b_0], ID'){
    r=b_lambda
    for (ctr=lambda-1;ctr>0;ctr--){
        r=MultiplyElementsGF(r, ID');
        r=r XOR b_ctr
    }
    return r;
}
```

The function "CalculateKey" performs the evaluation of the main polynomial with coefficients $b_{lambda}$, $b_{lambda-1}$, ..., $b_0$ at a point ID'. This evaluation requires the use of a function "MultiplyElementsGF"n which performs the multiplication of two elements a and b belonging to the subfield $Z_p$.

```
MultiplyElementsGF(a,b){
    aa=a, bb=b,r=0,t;
    while (aa!0){
        If ((aa & 1)!0) {r=r XOR bb;}
        t=bb AND 0x80000000;
        bb=bb<<1;
        if (t!=0) {bb=bb XOR 0x0000008D;}
        aa=aa>>1;
    }
    return r;
}
```

The block diagram of FIG. 2 shows the operating sequence of such an algorithm, wherein the return arrow around HORNER II represents evolution within the "while" loop, and the return arrow around both HORNER I and HORNER II represent evolution within the "for" loop. This hierarchical construction allows for the efficient evaluation and execution of polynomial based systems by distributing operations in a hierarchical two-level-way. At a high level we find the evaluation of the main polynomial whose evaluation is optimized by using HORNER I. Due to the special form of the field, we further optimize the system at a second level in combination with HORNER I. To this end, we add HORNER II interacting with HORNER I in each multiplication.

Accordingly, the evaluation of the keying material share segment has been reduced to arithmetical operations in $Z_2[x]/f(x)$ in a representative embodiment of the present invention which are quite simple and thus require low resources:

addition of two elements in $Z_2[x]/f(x)$ is defined as the XOR of both elements $C[x]+C'[x]=[c_{31}c_{30}\ldots c_w\ldots c_2c_1c_0]XOR[c'_3c'_{30}\ldots c'_2c'_1c'_0]$ multiplication of two elements in $Z_2[x]/f(x)$ is defined as usual, modulo f(x) $C[x]*C'[x]=(c_{31}x^{31}+\ldots+c_wx^w+\ldots+c_1x+c_0)*(c'_{31}x^{31}+\ldots+c'_wx^w+\ldots+c'_1x+c'_0)(\bmod f(x))$ For example, let's assume a monomial over the field $F_{2^8}$: P(y)=64y+225.

$a_1=53$ and $a_0=173$ are integers belonging to $F_{2^8}$, which means that they can be written as polynomials in $Z_2[x]/f(x)$, evaluated in 2.

In the present case, $a_1=53=a_1(w=2)$ where $a_1(w)=w^6+w^4+w^2+1$, thus $a_1$ can also be expressed as $a_1=01010101$.

Similarly, $a_0=173=a_0(w=2)=$ where $a_0(w)=w^7+w^5+w^3+w^2+1$, and $a_0$ can also be expressed as $a_0=10101101$.

Thus, if we want to evaluate the polynomial in y=ID=10101111, the computation corresponds to [01010101]*[10101111] XOR [01010101] (mod f(x)), which is a quite simple calculation, requiring low resources.

In an exemplary embodiment, each multiplication of factorized polynomias, or reduced polynomials, is further factorized or reduced by factorizing the evaluation of two polynomials of degree r−1. Such a factorization requires up to r−1 iterations and up to r−1 reductions.

The two-level of factorization, typically in HORNER I and HORNER II, allows computing a pariwise key in a multivariate polynomial-based alpha-secure system in less than alpha times r reductions.

Once each keying material share segment has been evaluated, then all these segments are concatenated in CONCAT, to generate the eventual shared key between the device ID and the device ID' by applying a hash function. In this example, the eventual shared key is obtained by concatenation of the different segments. However, in other embodiments, it may be obtained by other combinations, such as arithmetical or logical combinations of the key segments.

It has to be noted that the present invention can also be used in connection with alpha-secure digital signatures used for generating a crypto identifier ID of a device in a network that allows authenticating the device in the network. Such an approach is based on a set of parameters belonging to a device, or an entity, and representing its digital identity. The identifier ID, corresponding to a fingerprint, is then generated by hashing the parameters of the digital identity. The management device, based on the keying material share of the entity, and the ID, is able to determine whether the digital identity of the entity is authentic.

In a variant of this digital signatures approach, the identifier ID is segmented into several identifiers Hash(Digital Identity)=ID=$ID_1\|ID_2\|\ldots\|ID_t$.

In a network accommodating NWK_Size nodes and using alpha-secure digital signatures with t segments and each segment b' bits long (b'=log(q')=log(size of $F_q$)), an attacker can generate a forged identity with k collisions by recombining segments and sub-identifiers in the network with probability:

$$p_k = P(\text{collision\_in\_k\_segment}) = \binom{t}{k}(p_1)^k(1-p_1)^{t-k}$$

That means that the forged identifier contains k sub-identifiers that can be found in the network. This probability in the above expression depends on $p_1$ which is defined as:

$$p_1 = P(\text{collision\_in\_one\_segment}) = \frac{\text{NWK\_Size}}{\text{ID\_Space}} = \frac{\text{NWK\_Size}}{2^{b'}}$$

Therefore, we can reduce this probability if a larger b' is used, i.e., if longer segments are used.

This enlargement of b' is made possible by using an order $q=p^r$ because in such a case, as previously explained, each segment can be expressed in a polynomial basis as an element of $Z_p[x]/f(x)$. Thus, the evaluation of a keying material share segment at ID can be reduced to operations in the field $Z_p[x]/f(x)$. This allows implementing longer segments without requiring modular operations. The use of longer segments thus allows for increased certificate resiliency. Finally, less memory is needed since less segments are required to achieve the same certificate security level.

From the above, several advantages of the invention have appeared. First of all, this method allows optimizing the use of memory resources. Indeed, the present invention carries out keying material whose all coefficients belong to a finite field of size $2^r$. It means that all coefficients can be stored in exactly r bits, thus no memory is wasted in polynomial-based alpha-secure systems.

Moreover, finite fields $F_{p^r}$ are extensions of smaller fields such as $Z_p$, and the invention makes it possible to perform all computation in the smaller field, thus increasing the computation speed, and limiting the computation requirements of the device. More precisely, the use of a method according to the invention enables an implementation of a digital signatures approach with segments of 32 bits while:

reducing the memory requirements to achieve a security level similar, in the alpha-secure digital signatures, as when segments of 16 bits are used since longer segments can be efficiently implemented, and reducing the computation requirements for key generation using 32 bits segments.

Additionally, a computer program according to the invention requires less code memory to implement the algorithm of key generation than was needed in previous methods used.

In the present specification and claims the word "a" or "an" preceding an element does not exclude the presence of a plurality of such elements. Further, the word "comprising" does not exclude the presence of other elements or steps than those listed.

From reading the present disclosure, other modifications will be apparent to persons skilled in the art. Such modifications may involve other features which are already known in the art of securing communication which may be used instead of or in addition to features already described herein.

The invention claimed is:

1. A method for generating a shared key between a first node (D1) and a second node (D2) for secure communication in a network, the first node storing a first node keying material share based on a root keying material and the method comprising the following steps:
   a) the first node receiving an identifier of the second node,
   b) the first node evaluating the first node keying material share at a second node's identifier, to generate the shared key, wherein the first node keying material share is a polynomial-based keying material over a finite field $F_q$ and step b) comprises:
      b1) the first node factorizing the first node keying material under the form of a reduced polynomial over the field $F_q$ modulo an irreducible polynomial of degree r with coefficients in a sub-field of $F_q$, the reduced polynomial being arranged so that evaluating the first node keying material at the second node's identifier includes iteratively evaluating and combining monomials at the second node's identifier, over the field $F_q$, modulo the irreducible polynomial,
      b2) the first node computing the result of each monomial operation by evaluating at a predetermined point a polynomial of degree r−1 with coefficients in a sub-field of $F_q$ modulo the irreducible polynomial of degree r in a sub-field of $F_q$, the coefficient polynomial being arranged so that evaluating the coefficient polynomial corresponds to iteratively evaluating and combining monomials at the predetermined point over the sub-field of $F_q$ modulo the irreducible polynomial.

2. The method of claim 1 wherein q is a prime power $p^r$ here p is a prime number.

3. The method of claim 2 wherein the sub-field of $F_q$ is the sub-field $Z_p$, corresponding to the set of all integers modulo p.

4. The method of claim 1 wherein the factorization of step b1) corresponds to the application of a Horner's rule.

5. The method of claim 1, wherein only the coefficients of low degree and the coefficient of degree r of the irreducible polynomial are different from zero.

6. The method of claim 1, wherein the network further comprises a management device comprising the root keying material, and wherein the method further comprises a preliminary step of generating the first node keying material based on the root keying material and on an identifier of the first node, and transmitting it to the first node.

7. The method of claim 1, wherein the root keying material and the first node keying material share comprise several segments wherein step b) is performed for each first node keying material share segments to generate key segments, and the method further comprises:
   c) combining the key segments to obtain the shared key.

8. The method of claim 7 wherein combining the key segments in step c) is performed by concatenation or by logical combinations.

9. A communication network comprising two communicating entities representing a first node and a second node of the network,
   the first node comprising:
      a memory for storing a first node keying material share, and
      means for evaluating the first node keying material share at a second node's identifier, to generate the shared key, the means comprising:
         means for factorizing the first node keying material under the form of a reduced polynomial over the field $F_q$ modulo an irreducible polynomial of degree r over a sub-field of $F_q$, the reduced polynomial being arranged so that the evaluation of the first node keying material at the second node's identifier corresponds to iteratively evaluating and combining monomials over the field $F_q$, modulo the irreducible polynomial; and
         means for computing the result of each monomial operation by evaluating in a predetermined point a coefficient polynomial of degree r−1 over the field $F_q$ modulo the irreducible polynomial of degree r over the sub-field of $F_q$, the coefficient polynomial being arranged so that evaluating the coefficient polynomial corresponds to iteratively evaluating and combining monomials over the sub-field of $F_q$ modulo the irreducible polynomial.

10. The communication network of claim 9, further comprising a management device comprising:
   a root keying material,
   means for generating a first node keying material share, based on the root keying material and on an identifier of the first node, and
   a transmitter transmitting the first node keying material share to the first node.

11. A non-transitory computer-readable medium having one or more executable instructions stored thereon, which when executed by a digital processing system cause the digital processing system to perform a method for generating a shared key between a first node (D1) and a second node (D2) for secure communication in a network, the first node storing a first node keying material share based on a root keying material, the method comprising:

a) the first node receiving an identifier of the second node, b) the first node evaluating the first node keying material share at a second node's identifier, to generate the shared key, wherein the first node keying material share is a polynomial-based keying material over a finite field $F_q$ and step b) comprises:

b1) the first node factorizing the first node keying material under the form of a reduced polynomial over the field $F_q$ modulo an irreducible polynomial of degree r with coefficients in a sub-field of $F_q$, the reduced polynomial being arranged so that evaluating the first node keying material at the second node's identifier includes iteratively evaluating and combining monomials at the second node's identifier, over the field $F_q$, modulo the irreducible polynomial, b2) the first node computing the result of each monomial operation by evaluating at a predetermined point a polynomial of degree r−1 with coefficients in a sub-field of $F_q$ modulo the irreducible polynomial of degree r in a sub-field of $F_q$, the coefficient polynomial being arranged so that evaluating the coefficient polynomial corresponds to iteratively evaluating and combining monomials at the predetermined point over the sub-field of $F_q$ modulo the irreducible polynomial.

* * * * *